May 17, 1966  K. E. CLOSE  3,252,058
SYSTEM FOR DETECTING A MONITORING INPUT
Filed Jan. 28, 1963  2 Sheets-Sheet 1

INVENTOR.
KEITH E. CLOSE
BY Arthur H. Serrell
ATTORNEY

INVENTOR.
KEITH E. CLOSE
BY Arthur H. Serrell
ATTORNEY

United States Patent Office 3,252,058
Patented May 17, 1966

3,252,058
SYSTEM FOR DETECTING A MONITORING INPUT
Keith E. Close, Phoenix, Ariz., assignor to Sperry Rand Corporation, Great Neck, N.Y., a corporation of Delaware
Filed Jan. 28, 1963, Ser. No. 254,198
8 Claims. (Cl. 317—148.5)

This invention relates to a failsafe system for detecting the presence or absence of a monitoring input. In aircraft automatic pilots, such systems are operable to warn the human pilot of the approach of the craft toward a stall or other dangerous flight condition where the monitoring input is present. The detecting or output circuit of the improved system is continuously conditioned for operation in the absence of the monitoring input. Power supply circuitry or component failures in the system are unable to provide the result of the monitoring input. The improved system accordingly operates under failsafe conditions to provide detection only of the presence of the monitoring input.

An object of the present invention is to provide a system of the character described in which a miniature electrical package includes a minimum number of relay and amplifier components.

One of the features of the invention resides in the inclusion in the improved system of a detecting circuit with a silicon controlled rectifier and a failsafe relay.

Another feature of the invention is provided by the inclusion in the package of a switching circuit with a tunnel diode that is triggered by a positive polarity power output and cutoff by a negative polarity monitoring output.

Still a further feature of the invention is provided by the inclusion in the package of a gating circuit between the rectifier and diode having a failsafe arrangement of transistors providing power amplification for the system and an isolating transformer therein.

Figure 1:
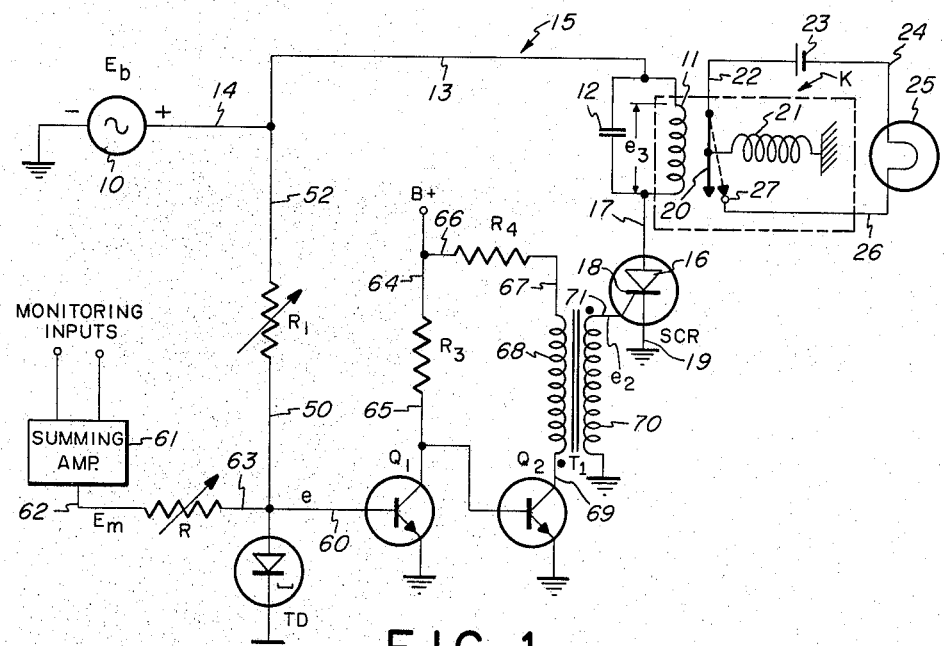
Figure 2:
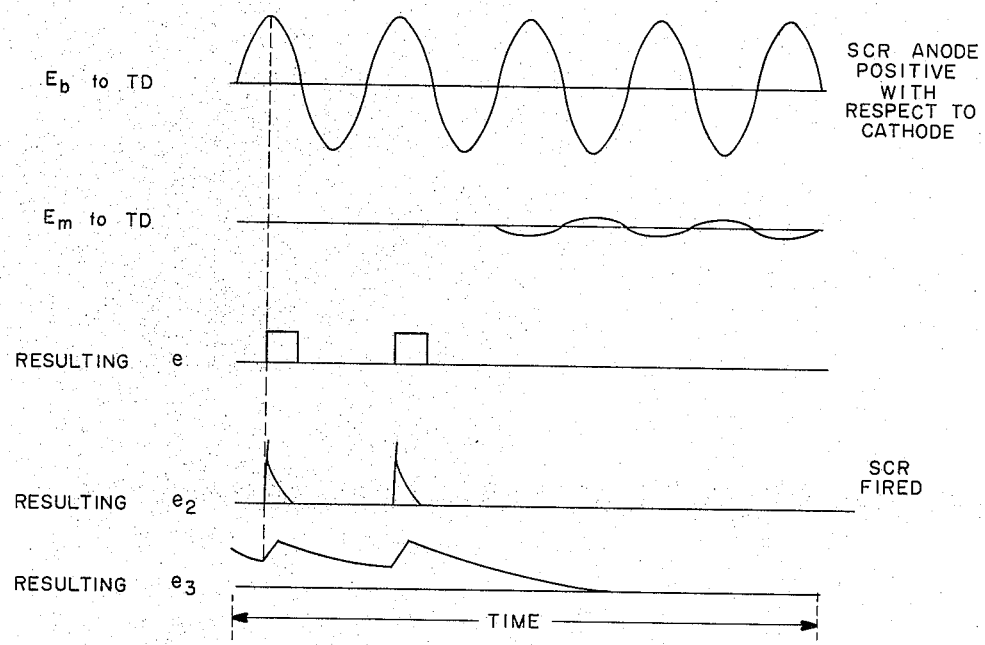
Figures 3, 4:
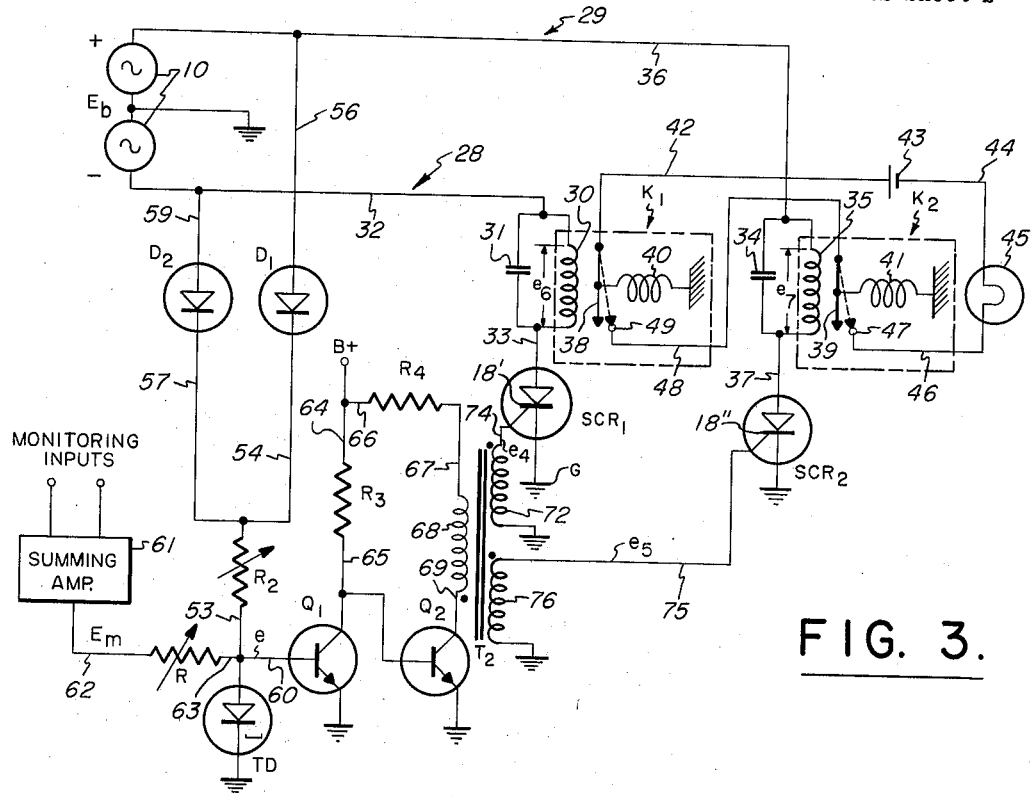

Other objects, features, and structural details of the invention will be apparent from the following description with relation to the accompanying drawings, in which:

FIG. 1 is a wiring diagram of an embodiment of the invention in which the detecting circuit of the improved system includes one relay and one silicon controlled rectifier, FIG. 2 shows a series of curves related to the individual circuits included in FIG. 1, FIG. 3 is a wiring diagram of a modified embodiment of the invention in which the detecting circuit includes two branches connected to an A.C. reference output in 180° out-of-phase relation, each branch of which includes an individual relay and silicon controlled rectifier, and FIG. 4 shows a series of curves related to the individual circuits included in FIG. 3.

In the drawings, the energizing power source for the components of the system is represented as a means providing an A.C. power output 10 whose changing polarity voltage is indicated at $E_b$. In the embodiment of the invention shown in FIG. 1 where the relay means included in the system is provided by a single relay K, the coil 11 of the relay K connected in parallel with a condenser 12 is arranged in series relation to the source 10 by connecting leads 13 and 14 in a unidirectional detecting circuit 15. The rectifying means included in the circuit 15 is provided by a single silicon controlled rectifier SCR whose anode part 16 is connected by lead 17 to the end of the parallel circuit including coil 11 and condenser 12 opposite to the connection thereto of the lead 13. The cathode 18 of the silicon controlled rectifier SCR is connected to ground by way of lead 19 with the rectifier being connected to source 10 in series relation. In the described detecting circuit, the SCR functions as a gate that permits the unidirectional flow of current from source 10 through the coil 11 to ground. Triggering of the provided gating element is dependent on the synchronization timewise of a positive polarity input at the anode 16 of the SCR with a pulse input to the gate 18 thereof. In the improved system, the SCR is normally triggered so that the relay coil 11 is energized by the pulsating direct current flowing through the detecting circuit 15. The output circuit controlled by relay K in FIG. 1 is represented as a normally open circuit including the armature 20 of relay K with a biasing spring 21, lead 22 from the fixed end of the armature 20 to battery 23, lead 24 to an indicator such as an electric light bulb 25 and lead 26 to the open contact 27 for the movable end of the armature. In the operative condition of the components shown in FIG. 1, the absence of illumination of bulb 25 is indicative of the absence of a monitoring input to the system. If for any reason the relay coil 11 is deenergized, the spring 21 is effective to move the armature 20 against contact 27 to close the output circuit and illuminate the bulb 25 and thereby give a visual warning to the human pilot of the presence of a monitoring input or malfunction of the system.

In the embodiment of the invention shown in FIG. 3, the power source 10 is represented as center-tapped to ground to provide two A.C. power outputs that are in 180 degree out-of-phase relation. Here, the detecting circuit of the system is provided with two branches with individual relay and recifier components connected in series relation to the source 10. As shown in FIG. 3, branch 28 includes the relay $K_1$ and the silicon controlled rectifier $SCR_1$ and branch 29 includes the relay $K_2$ and silicon controlled rectifier $SCR_2$. Both rectifiers $SCR_1$ and $SCR_2$ provide positive polarity gates whose cathodes in the respective branches are connected to ground. The anode of the rectifier $SCR_1$ is connected to the source 10 through relay $K_1$ in the same manner as that shown in FIG. 1. The gates of $SCR_1$ and $SCR_2$ are respectively indicated at 18' and 18". Here, one end of the parallel circuit including relay coil 30 and condenser 31 is connected to the source 10 by way of lead 32. Lead 33 connects the other end of the parallel condenser 31-coil 30 circuit to the anode of the recifier $SCR_1$. Similarly in the branch 29, one end of the parallel circuit including condenser 34 and coil 35 of relay $K_2$ is connected to the source 10 by way of lead 36. The opposite end of the parallel circuit is connected by lead 37 to the anode of the silicon controlled rectifier $SCR_2$. In FIG. 3, the armatures 38 and 39 of the respective relays $K_1$ and $K_2$ are normally conditioned as previously described in FIG. 1 against the influence of the respective biasing springs 40 and 41. Here, the armatures of the respective relays $K_1$ and $K_2$ are arranged in series relation in an output circuit that includes lead 42 connected to the fixed end of the armature 38, battery 43, lead 44, the normally nonilluminated electric bulb 45, lead 46 to the switch contact point 47 of armature 39, and lead 48 between the fixed end of the armature 39 and the switch contact point 49 of armature 38. In the off or unenergized condition of the relays $K_1$ and $K_2$, the armatures 38, 39 are urged by springs 40, 41 to an engaged relation with contacts 49, 47 to close the output circuit and effect illumination of bulb 45 to warn the human pilot of the presence of a monitoring input or of malfunction of the system. In this described embodiment of the improved system, both branches 28 and 29 of the detecting circuit normally conduct pulsating direct current through the relay coils 30, 35 and the triggered rectifiers $SCR_1$ and $SCR_2$.

In both embodiments of the invention shown in the drawing, the switching circuit of the system includes a tunnel diode TD which provides a stable trigger level for operating the pulse circuit to gate the respective silicon controlled rectifiers SCR, $SCR_1$ and $SCR_2$. In the arrangement provided, the tunnel diodes TD are normally held in a high voltage output state to produce pulses ($e$) as shown in FIGS. 2 and 4 in timed relation to the positive polarity inputs thereto from the power source 10. The tunnel diodes TD function as switches in the system that are triggered from the power source 10 by an output of positive polarity and are cut off by a monitoring output of negative polarity. As shown in FIG. 1, the cathode of the tunnel diode is connected to ground and its anode is connected to the power source 10 by way of lead 50, variable resistor $R_1$ and lead 52 to lead 14. The anode of the tunnel diode TD shown in FIG. 3 is likewise connected to the lead 36 of the detecting branch circuit 29 by way of lead 53, variable resistor $R_2$, lead 54, diode $D_1$ and lead 56. The input connection to the supply branch circuit lead 32 includes lead 53, resistor $R_2$ and lead 57, diode $D_2$ and lead 59. In the absence of a monitoring input to the switching circuit to lower the input voltage $E_b$ to the tunnel diodes TD below cutoff, the pulse voltage ($e$) is present at the output lead 60 of the circuit. A summing amplifier 61 that receives suitable monitoring inputs is represented in the drawing as the means for providing the monitoring voltage output $E_m$ of the system. As shown, the amplifier 61 is connected in the switching circuit to the tunnel diode TD by way of lead 62, variable resistor R and lead 63 to lead 50 in FIG. 1 and to lead 53 in FIG. 3. The provided monitoring input voltage $E_m$ is of the same frequency as that of the power source 10. As shown in FIGS. 2 and 4, the monitoring output voltages $E_m$ of negative polarity to the tunnel diodes TD reduce the operating level thereof below cutoff to interrupt the formation of the pulse voltages ($e$) normally appearing along the time axis of curves.

The gating circuit of the improved system connects the tunnel diodes TD to the gates of the respective silicon controlled rectifiers so that the relays K, $K_1$ and $K_2$ are energized when the diodes are triggered and unenergized when the diodes are cut off by the monitoring input. This circuit includes transistor means for providing power amplification of the output of the tunnel diodes TD in form of a pair of transistors $Q_1$ and $Q_2$. As shown, the collectors of the respective transistors are biased from a common B+ source, the bias circuit for transistor $Q_1$ including lead 64, resistance $R_3$ and lead 65, and the circuit for transistor $Q_2$ including lead 66 to lead 64, resistance $R_4$, lead 67, the primary winding 68 of transformer $T_1$ in FIG. 1 and $T_2$ in FIG. 3, and lead 69. The power transistors are arranged in staged relation to the tunnel diode TD with the first stage of amplification being provided by transistor $Q_1$ and the second stage by transistor $Q_2$. The amplified output of the provided transistor means energizes the primary winding 68 of the respective coupling transformers. In the embodiment of the invention shown in FIG. 1, the secondary winding 70 of transformer $T_1$ is connected to the gate 18 of the silicon controlled rectifier SCR by way of lead 71. Here, the voltage output $e_2$ represented in FIG. 2 is a positive polarity pulse that is synchronized timewise at the rectifier SCR with the positive polarity output $E_b$ at the anode of the rectifier. This gates the unidirectional circuit 15 and pulsating direct circuit flows therethrough from source 10, through coil 11 and rectifier SCR to ground. The relay K is accordingly energized by a varying voltage $e_3$ across the coil of the relay as shown in FIG. 2. The condenser 12 included in the unidirectional circuit 15 smooths the voltage $e_3$ so that the coil 12 remains energized as long as the tunnel diode TD is triggered to provide the voltage pulses $e_2$. When a monitoring output appears in the system as represented in FIG. 2 by the voltage $E_m$, the tunnel diode is cut off, the SCR blocks the unidirectional circuit and the coil of relay K is unenergized. The output circuit is then effective under control of the spring 21 to provide illumination of the bulb 25.

In the embodiment of the invention shown in FIG. 3, the isolating transformer $T_2$ includes a secondary winding for each of the silicon controlled rectifiers. Here, winding 72 providing the output voltage pulse $e_4$ is connected to the gate 18' of the $SCR_1$ by lead 74. Lead 75 connects the secondary winding 76 of transformer $T_2$ to the gate 18" of the $SCR_2$. Here, the pulse normally supplied the $SCR_2$ is indicated at $e_5$. The system functions as heretofore described with both branches of the unidirectional circuit conducting as long as there is a voltage $e_7$ provided relay $K_2$ and voltage $e_6$ provided relay $K_1$. With cutoff of the tunnel diode TD by a monitoring output $E_m$ as represented in FIG. 4, the warning condition is observed at bulb 45 when both relays $K_1$ and $K_2$ are unenergized or off and the output circuit is closed. The transformer in the gating circuit isolates the transistors and B+ from the rectifiers to assure that no open circuit or failure of the components therein is able to create a condition simulating the monitoring input to result in incorrect operation of the relays. The improved system is failsafe as it requires both $E_b$ and B+ as inputs and an unshorted condition of the individual circuits provided for energizing the included relay or relays of the unidirectional detecting circuit.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A failsafe system for detecting the presence or absence of a monitoring input including means providing an A.C. power output, means providing a monitoring output of the same frequency as the power output, a unidirectional circuit including relay means and silicon controlled rectifying means with cathode, gate and anode parts having the anode part connected to the power output means and the cathode part connected to ground, an output circuit controlled by the relay means in the unidirectional circuit, a switching circuit including a tunnel diode triggered by a power output of positive polarity and cut off by a monitoring output of negative polarity, and a circuit for gating the rectifying means to operate the relay means of the unidirectional circuit in the absence of a monitoring output including a pair of power amplifying transistors with biased collectors arranged in staged relation to the diode, an isolating transformer with a winding energized by the output of the transistors and a winding connected to the gate part of the silicon controlled rectifying means.

2. A system of the character claimed in claim 1, in which the unidirectional circuit includes a first branch with a relay and a silicon controlled rectifier providing a positive polarity gate, a second branch with a relay and a silicon controlled rectifier providing a positive polarity gate, and where the respective branches are connected to the power output means in 180 degree out-of-phase relation.

3. A system of the character claimed in claim 2, in which the respective relays include a coil in the first branch and an armature, and a coil in the second branch and an armature, and the armatures of the relays are arranged in series relation in the output circuit.

4. A failsafe system for detecting the presence or absence of a monitoring input including means providing an A.C. power output, means providing a monitoring output of the same frequency as the reference output; a unidirectional circuit having a first branch with a relay and a silicon controlled rectifier with cathode, gate and anode parts having the anode part connected to the power output means and the cathode part connected to ground; a second branch with a relay and a silicon controlled rectifier with gate and anode parts having the anode part connected to the power output means in 180 degree out-of-phase relation to the rectifier in the first branch, an output circuit controlled by the relays in the first and second branches of the unidirectional circuit, a switching circuit including a tunnel diode triggered by a power output of positive polarity and cut off by a monitoring output of negative polarity, and a gating circuit for operating the relays of the unidirectional circuit in the absence of a monitoring output including a pair of power amplifying transistors with biased collectors arranged in staged relation to the diode, an isolating transformer with a primary winding energized by the output of the transistors, a first secondary winding connected to the gate part of the rectifier in the first branch of the unidirectional circuit, and a second secondary winding connected to the gate part of the rectifier in the second branch of the unidirectional circuit.

5. A system of the character claimed in claim 4, in which the relays of the first and second branches of the unidirectional circuit include armatures arranged in series relation in the output circuit.

6. In a failsafe system of the character described, a detecting circuit having a relay and a silicon controlled rectifier providing a positive polarity gate connected to an A.C. power output, a switching circuit connected to the power output and a monitoring output having the same frequency as the power output including a tunnel diode triggered by the positive polarity power output and cut off by the negative polarity monitoring output, and a gating circuit providing a positive polarity input to the rectifier of the detecting circuit from the diode for operating the relay in the absence of a monitoring output including transistor means with biased collectors connected in stage relation to amplify the output of the diode, and an isolating transformer connecting the output of the transistor means to the rectifier.

7. In a failsafe system of the character described; a detecting circuit having a first branch with a relay and a silicon controlled rectifier providing a positive polarity gate connected to an A.C. power output, a second branch with a relay and a silicon controlled rectifier providing a positive polarity gate connected to the A.C. power output in 180 degree out-of-phase relation to the rectifier in the first branch, a switching circuit connected to the power output and a monitoring output having the same frequency as the power output including a tunnel diode triggered by the positive polarity power output and cut off by the negative polarity monitoring output, and a gating circuit providing a positive polarity input to the rectifiers of the detecting circuit from the diode in the absence of a monitoring output including transistor means with biased collectors connected in staged relation to amplify the output of the diode, an isolating transformer with a primary winding energized by the output of the transistor means, a first secondary winding connected to the rectifier in the first branch of the detecting circuit and a second secondary winding connected to the rectifier in the second branch of the detecting circuit.

8. In a failsafe system of the character described, a detecting circuit having a silicon controlled rectifier providing a positive polarity gate connected to an A.C. power output, a switching circuit connected to the power output and a monitoring output having the same frequency as the power output including a tunnel diode triggered by the positive polarity power output and cut off by the negative polarity monitoring output, and a gating circuit providing a positive polarity input to the rectifier of the detecting circuit from the diode in the absence of a monitoring output including transistor means with biased collectors for amplifying the output of the diode and an isolating transformer between the transistor means and the rectifier.

References Cited by the Examiner
UNITED STATES PATENTS

| | | | |
|---|---|---|---|
| 2,994,063 | 7/1961 | Gibson | 317—148.52 |
| 3,065,361 | 11/1962 | Brook | 307—88.5 |

SAMUEL BERNSTEIN, *Primary Examiner.*

L. T. HIX, *Assistant Examiner.*